(12) United States Patent
Ahn et al.

(10) Patent No.: US 8,738,102 B2
(45) Date of Patent: May 27, 2014

(54) SLIDING TYPE PORTABLE TERMINAL

(75) Inventors: Sung-Ho Ahn, Seoul (KR); Won-Tae Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 724 days.

(21) Appl. No.: 12/898,799

(22) Filed: Oct. 6, 2010

(65) Prior Publication Data
US 2011/0143825 A1    Jun. 16, 2011

(30) Foreign Application Priority Data
Dec. 11, 2009  (KR) .................. 10-2009-0123202

(51) Int. Cl.
*H04M 1/00*  (2006.01)
(52) U.S. Cl.
USPC ..................... 455/575.4; 455/575.1
(58) Field of Classification Search
USPC ........... 455/575.4, 575.1, 575.3, 566; 16/362; 74/44
See application file for complete search history.

(56) References Cited

U.S. PATENT DOCUMENTS

| | | | |
|---|---|---|---|
| 2006/0046796 A1* | 3/2006 | Park et al. | 455/575.4 |
| 2006/0154515 A1* | 7/2006 | Seo | 439/500 |
| 2009/0181734 A1* | 7/2009 | Kato et al. | 455/575.4 |
| 2010/0151924 A1* | 6/2010 | Amano | 455/575.4 |
| 2010/0178963 A1* | 7/2010 | Iwaki | 455/575.4 |
| 2011/0136554 A1* | 6/2011 | Wong et al. | 455/575.4 |
| 2011/0167592 A1* | 7/2011 | Han | 16/362 |

FOREIGN PATENT DOCUMENTS

| | | | | |
|---|---|---|---|---|
| KR | 10-855945 | 8/2008 | | H04B 1/38 |
| KR | 10-905318 | 6/2009 | | H04B 1/38 |

OTHER PUBLICATIONS

Nam_machine translation_KR 905318MT_pub.date_07-02-09.pdf.*

* cited by examiner

*Primary Examiner* — Charles Appiah
*Assistant Examiner* — Alexander Yi
(74) *Attorney, Agent, or Firm* — Cha & Reiter, LLC

(57) ABSTRACT

A sliding type portable terminal includes a first housing and a second housing slidably engaged face-to-face with the first housing. The portable terminal includes a guide member mounted in a first closed area provided on one surface of the first housing and always covered up by the second housing, and a slide member mounted on one surface of the second housing and sliding over the first housing by being guided by the guide member. A wiring passageway for wiring a flexible printed circuit board is formed in the slide member. The flexible printed circuit board is wired through a slit for coupling the guide member to the slide member without providing a slide cover for opening/closing the wiring passageway or forming a separate wiring passageway, thereby preventing the flexible printed circuit board from being exposed to the outside and ensuring elegant appearance of the terminal.

22 Claims, 17 Drawing Sheets

SLIDING TYPE PORTABLE TERMINAL

CLAIM OF PRIORITY

This application claims the benefit under 35 U.S.C. §119(a) of a Korean Patent Application filed in the Korean Intellectual Property Office on Dec. 11, 2009 and assigned Serial No. 10-2009-0123202, the entire disclosure of which is hereby incorporated by reference.

BACKGROUND OF THE INVENTION

1. Field of the Invention

The present invention relates generally to a portable terminal and housings for same. More particularly, the present invention relates to a sliding type portable terminal, in which a pair of housings are slidably engaged face-to-face and a keypad having a QWERTY key layout to facilitate convenient use.

2. Description of the Related Art

In general, a 'portable terminal' refers to a handheld device with which a user can enjoy a variety of functions including communications, scheduling, multimedia playing, games and an electronic dictionary, and having functionality while being mobile. The legacy mobile communication terminal, which provided simple voice call services at its early stage, has increasingly developed to include various functions including the above-mentioned scheduling, multimedia playing and games, and recently the ability to support real-time services such as wireless Internet, video file transfer and Digital Multimedia Broadcasting (DMB), and transmission/reception of high-capacity information files.

Owing to the development of such high-end technologies, and the ongoing miniaturization of semiconductors, the functions of various types of portable terminals and services provided through them may be all included by only a single mobile communication terminal. That is, in addition to the voice call and multimedia services provided from the mobile communication service providers, a user may access the Internet with his mobile communication terminal without having to access a mobile communication service network in the area where the wireless Internet is available. In this communication environment, the user can download his desired contents over the Internet.

An input device such as, for example, a QWERTY keypad is required to manipulate a scheduler and to send and receive E-mails and the like over the wireless Internet. Although inputting a variety of characters is possible even with a keypad of a common mobile phone, use of the QWERTY keypad makes it possible to write and send urgent messages or lengthy E-mails more rapidly and accurately as opposed to have to make multiple presses of a single key on a typical numeric phone pad to select the desired letter of the alphabet.

However, considering a distance between a mouthpiece and an earpiece on the mobile communication terminal, a display device and a keypad are commonly disposed lengthwise, making it difficult to ensure an efficient input device such as the QWERTY keypad. That is, when actually manipulating the terminal, the user manipulates the keypad and the like holding the terminal in a vertical direction, which makes it difficult to dispose the QWERTY keypad because of the narrow horizontal width of the terminal. A number of PDAs, for example, have such a keypad and the keys are extremely narrow in area as compared with an adult's finger tip.

As an alternative, a new terminal has emerged in which a display device with a touch screen is installed on the front side to enable convenient use of multimedia features and to realize a QWERTY keypad on the touch screen when the user writes lengthy E-mails or the like holding the terminal in a horizontal direction, facilitating convenient manipulation. Such a touch screen-based terminal makes it easy to realize a variety of input devices, including the QWERTY keypad, on the display device. As a typical QWERTY keyboard conventionally is a rectangle with two longer sides in the horizontal direction, users often find such a design as being more ergonomically appealing to them.

In addition, a new sliding type portable terminal has been launched, in which a keypad is installed on a first housing formed long in a vertical direction and may be opened/closed by sliding a second housing in a horizontal direction with respect to the first housing, enabling a QWERTY key layout. Thus, the user can manipulate the keypad holding the terminal in a horizontal direction, with the keypad opened.

However, the manufacture of a terminal with a keypad slidable in a horizontal direction has many difficulties in securing a wiring structure of a flexible printed circuit board connecting circuit devices in the first and second housings.

That is, in order to secure a sufficient length considering the sliding distance of the second housing, the flexible printed circuit board wired between the first and second housings is wired in a curved manner on the first and second housings, increasing its possible damage due to interference or the like caused by the sliding of the second housing.

Also, in order for the second housing to secure a sufficient space for the QWERTY key layout when sliding in a horizontal direction, it is difficult to secure a space to cover up the flexible printed circuit board between the first and second housings. Because of this, when the second housing slides in a horizontal direction, the flexible printed circuit board can be exposed to the outside elements, increasing the possibility of damage and spoiling appearance of the terminal.

SUMMARY OF THE INVENTION

An exemplary aspect of the present invention is to provide a sliding type portable terminal that includes a keypad having a QWERTY key layout and may prevent a flexible printed circuit board and/or its wiring structure from being exposed. The present invention provides numerous advantages and improvements unknown heretofore in such devices.

Another exemplary aspect of the present invention provides a sliding type portable terminal capable of ensuring an elegant appearance by preventing a flexible printed circuit board and/or its wiring structure from being exposed to the user's view.

A further exemplary aspect of the present invention provides a sliding type portable terminal capable of mitigating a possible damage of a flexible printed circuit board despite the repetitive sliding action involved in opening/closing operations associated with prolonged use of the device.

In accordance with an exemplary embodiment of the present invention, there is provided a sliding type portable terminal including a first housing and a second housing slidably engaged face-to-face with the first housing, in which a guide member is mounted in a first closed area provided on one surface of the first housing, and always covered up by the second housing, a slide member is mounted on one surface of the second housing and slides over the first housing by being guided by the guide member, a wiring opening (i.e. a passageway) is formed in the slide member, and a slide cover is slidably mounted on the slide member to open/close the wiring passageway. On the slide member, one portion of the wiring passageway is formed in a second closed area always covered up by the first housing, and the remaining portion is formed in an opening/closing area that is opened/closed by the first housing according to sliding of the second housing. When the opening/closing area is opened, the slide cover closes at least the remaining portion of the wiring passageway, which is formed in the opening/closing area.

The slide cover prevents an inner structure of the second housing from being exposed through the wiring passageway. A flexible printed circuit board is wired in a curved manner in the inside of the second housing, thereby securing a sufficient length required for sliding of the second housing and preventing its exposure to the outside.

In accordance with another exemplary embodiment of the present invention, there is provided a sliding type portable terminal including a first housing and a second housing slidably engaged face-to-face with the first housing, in which a guide member is mounted in a first closed area provided on one surface of the first housing, and always covered up by the second housing, a slide member is mounted on one surface of the second housing and slides over the first housing by being guided by the guide member, a pair of slits are formed in the slide member and extend along a moving direction of the second housing in parallel with each other, and a flexible printed circuit board is provided that is led out from the first housing, led into the second housing (i.e. extends from the first housing into the second housing) via one of the slits, extends in the second housing along the moving direction of the second housing, and is wired in a U-shaped form in a curved manner so that at least one portions face each other. The guide member is engaged to wrap an inner wall of at least one of the slits.

Accordingly, by wiring the flexible printed circuit board via a slit for sliding coupling without separately forming a wiring passageway for wiring the flexible printed circuit board, the present invention advantageously makes it possible to prevent the flexible printed circuit board from being exposed to the exterior environment.

BRIEF DESCRIPTION OF THE DRAWINGS

The above and other exemplary aspects, features and advantages of certain exemplary embodiments of the present invention will become more apparent from the following description taken in conjunction with the accompanying drawings, in which.

Throughout the drawings, the same drawing reference numerals will be understood to refer to the same or similar elements, features and structures.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding that are to be regarded as merely exemplary for illustrative purposes. Accordingly, those of ordinary skill in the art will recognize that various changes and modifications of the exemplary embodiments described herein can be made without departing from the scope and spirit of the claimed invention. In addition, descriptions of well-known functions and constructions may be omitted for clarity and conciseness when their inclusion could obscure appreciation of the subject matter of the present invention by a person of ordinary skill in the art.

Figure 1:
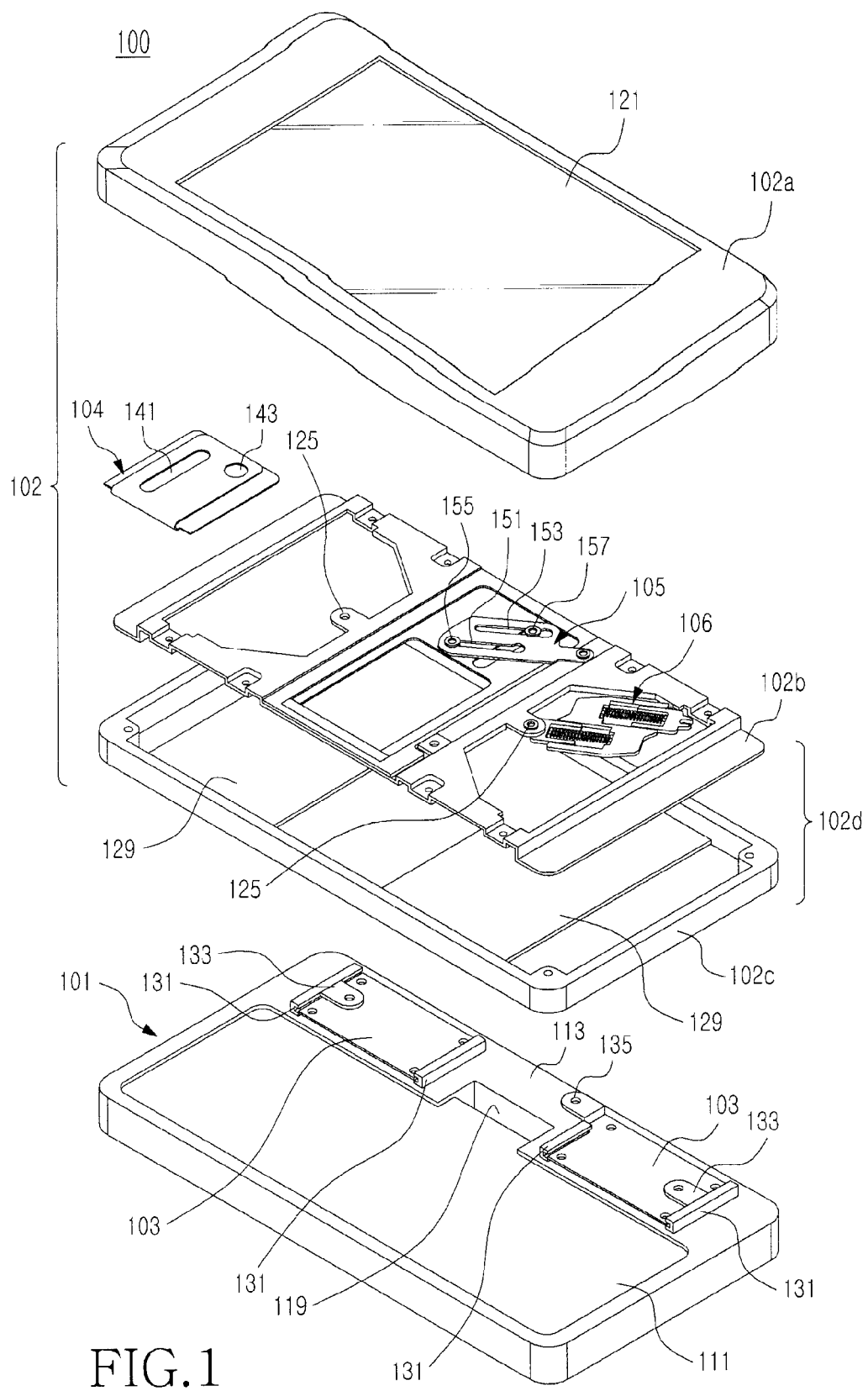
FIG. 1 is an exploded perspective view of a sliding type portable terminal according to a first exemplary embodiment of the present invention.

FIG. 1 is an exploded perspective view of a sliding type portable terminal 100 according to a first exemplary embodiment of the present invention. As shown in FIG. 1, the sliding type portable terminal 100 preferably includes a first housing 101 and a second housing 102 slidably engaged face-to-face with the first housing 101. The second housing 102 is slidable in a direction of its width, which is narrower than a length of the first housing 101. However, it should be noted in FIG. 1 that for convenience, the terminal 100 is shown to be placed long in a horizontal direction and the second housing 102 is shown to be slidable in a vertical direction.

The second housing 102 (comprised of components 102l, 102b, 102c and 102d) preferably includes a housing member 102a and a slide member 102d coupled to the rear of the housing member 102a. The slide member 102d may cover up part of the internal space of the housing member 102a at the rear of the housing member 102a. On the first housing 101 are installed guide members 103 to guide sliding of the slide member 102d.

The first housing 101 includes a first opening/closing area 111 which is opened/closed by the sliding of the second housing 102, and a first closed area 113 which is always closed regardless of the sliding of the second housing 102. Although not shown, a keypad preferably having a QWERTY key layout is mounted on the first opening/closing area 111 and opened/closed by the second housing 102. A display device 121 is installed on the front of second housing 102, and a mouthpiece and an earpiece (both not shown) may be installed on both sides of the display device 121, respectively, to be used for voice calls.

With continued reference to FIG. 1, a pair of the guide members 103 is mounted on the first closed area 113, and guide ribs 131 are formed face-to-face on both side ends of each of the guide members 103. One of the guide members 103 has a first support piece 135 extending from one of the guide ribs 131, and each of the guide members 103 has a second support piece 133. The guide members 103 are located close to each other on both side ends of the first housing 101, the first support piece 135 extends toward a space between the guide members 103, and the second support pieces 133 extend toward the insides of their guide members 103.

In this exemplary embodiment, the slide member 102d preferably includes a moving member 102c slidable by being guided by the guide members 103, and a support member 102b coupled to the moving member 102c and supporting an elastic member 106, constituting part of the second housing 102.

The moving member 102c includes flat boards 129 slidable by being guided by the guide members 103, and the flat boards 129 cover up the rear of the second housing 102, especially part of the rear of the housing member 102a. The guide ribs 131 provided on each of the guide members 103 have guide grooves formed on their facing surfaces, and are engaged with the flat boards 129, wrapping both side ends of each of the flat boards 129. Most of the remaining area except for the areas where the flat boards 129 are provided in the moving member 102c is open at the rear of the second housing 102. The support member 102b is coupled to the moving member 102c, covering up the open area of the moving member 102c. However, it is to be noted that a wiring passageway 123 (shown in FIG. 2 and other drawings) is formed in the center of the support member 102b, providing a space through which a flexible printed circuit board 109 (shown in FIG. 2 and other drawings) is subjected to wiring.

The support member 102b supports the elastic member 106 providing a driving force for the sliding of the second housing 102, and provides a means by which it is possible to install a slide cover 104 for opening/closing the wiring passageway 123. As mentioned above, as the moving member 102c is engaged with the support member 102b, the rear of the second housing 102 is covered up, and the flexible printed circuit board 109 is subjected to wiring by way of the wiring passageway 123 formed in the support member 102b.

The rear of the second housing 102 may be divided, for example, into a second closed area and a second opening/closing area. That is, as the second housing 102 slides, part of the rear of the second housing 102 is opened/closed by the first housing 101. The second opening/closing area means an area that is opened/closed by the first housing 101 due to the sliding of the second housing 102, and the second closed area means an area that is always closed regardless of the sliding of the second housing 102.

Part of the wiring passageway 123 is situated in the second closed area and the remaining part is situated in the second opening/closing area, in order to secure a mobile space for the flexible printed circuit board 109 during the sliding of the second housing 102. A detailed description thereof will be given below with reference to FIGS. 2 and 3.

The slide cover 104 is slidably engaged over the wiring passageway 123 and opens/closes the wiring passageway 123 by means of the sliding of the second housing 102. The slide cover 104 is formed in a U-shaped form and installed to wrap both sides of the support member 102b, and its at least one portion is situated over the wiring passageway 123.

If the moving member 102c and the support member 102b are coupled to each other and then engaged with the guide members 103, the first support piece 135 is placed inside the support member 102b, i.e., inside the second housing 102, via an avoiding hole (not shown) formed in the support member 102b. The second support pieces 133 are placed between the moving member 102c and the support member 102b, and may be disposed in such a manner that the support member 102b wraps part of the circumferences of the guide ribs 131.

The terminal 100 includes a link member 105 in order to link the sliding of the slide cover 104 and the second housing 102. The link member 105 has one end rotatably coupled to the first support piece 135. As mentioned before, the first support piece 135 is placed inside the support member 102b via the undepicted avoiding hole. It is obvious that the avoiding hole should extend in a sufficient length so that even though the slide member 102d slides with respect to the first housing 101, the first support piece 135 may not be interfered with by the support member 102b. That is, the avoiding hole extends along the sliding direction of the second housing 102 and its length is set equal to or longer than a moving range of the second housing 102.

As shown in FIG. 1, the link member 105 has first and second long holes 151 and 153 (i.e. first and second slots) extending in parallel with each other. A first support projection 155 fixed to the support member 102b is slidably fitted into the first slot 151, while a second support projection 157 fixed to the slide cover 104 is slidably fitted into the second slot 153. A distance between the second support projection 157 and one end of the link member 105 is set shorter than a distance between the first support projection 155 and one end of the link member 105. In other words, compared with the first support projection 155, the second support projection 157 is disposed closer to one end of the link member 105.

A slot or long hole 141 is formed in the slide cover 104 so that the first support projection 155 may not be directly interfered with by the slide cover 104, and a coupling hole 143 may be formed in the slide cover 104 to bind the second support projection 157.

Figure 6A:
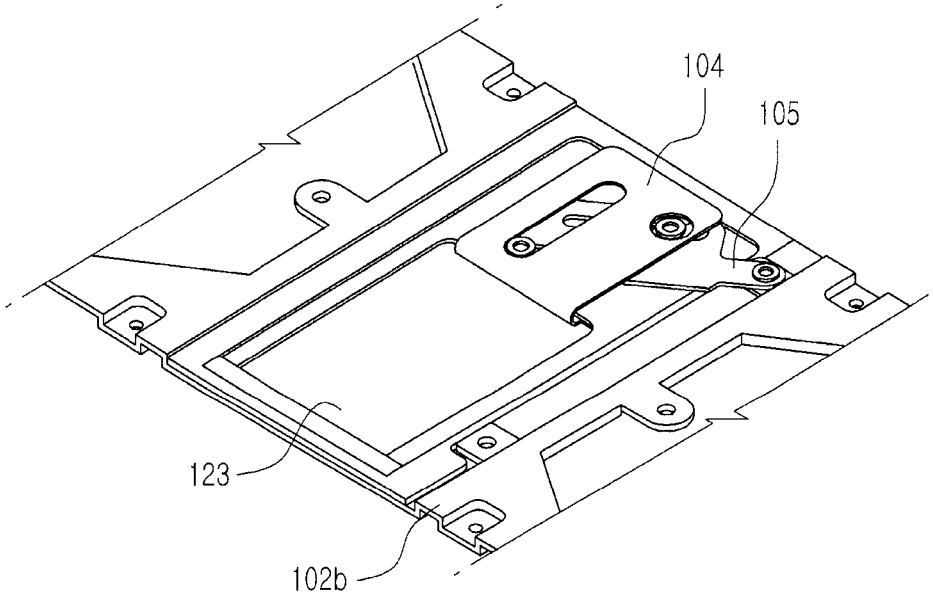
FIGS. 6A and 6B are diagrams showing an operation of a slide cover of the portable terminal shown in FIG. 1.
Figure 6B:
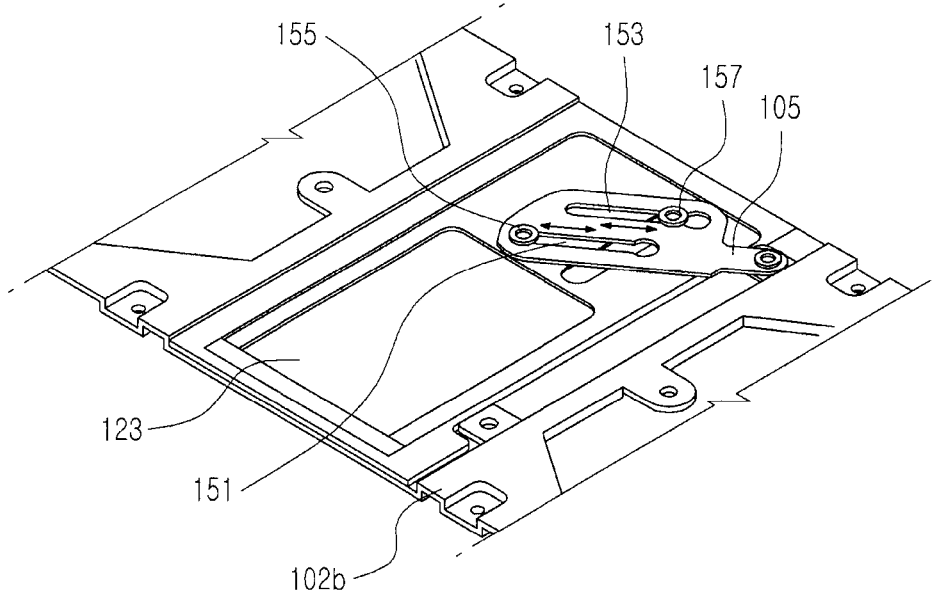

Referring now to FIGS. 6A and 6B, if the second housing 102, especially the slide member 102d slides, the first support projection 155 also slides along with the second housing 102. Because the first support projection 155 is fitted into the first slot 151, the link member 105 rotates around its one end as the second housing 102 slides. The second support projection 157 and the slide cover 104 also slide with respect to the first housing 101 along with the second housing 102 by the rotation of the link member 105. However, since both the first and second support projections 155 and 157 are restrained by the rotation of the link member 105 and the second support projection 157 is placed closer to one end of the link member 105 compared with the first support projection 155, a moving range of the second support projection 157 is relatively shorter than a moving range of the first support projection 155.

Therefore, a distance that the second support projection 157 and the slide cover 104 slide with respect to the first housing 101 by the sliding of the second housing 102 is relatively shorter than a distance that the slide member 102d or the first support projection 155 slides with respect to the first housing 101, which causes sliding of the slide cover 104 with respect to the support member 102b. That is, if the second housing 102 slides with respect to the first housing 101, the slide cover 104 slides with respect to the support member 102b.

The above-mentioned elastic member 106 provides an elastic force for urging its both ends toward the opposite directions, and has one end supported by the second support piece 133 and the other end supported by a third support piece 125 formed on the support member 102b. A point where both ends of the elastic member 106 are closest to each other is situated within a range where the second housing 102 slides. Therefore, the second housing 102 moves in a direction of closing the first opening/closing area 111 in a specific section of its moving range and moves in a direction of opening the first opening/closing area 111 in the remaining sections, by means of the elastic force of the elastic member 106.

Figure 2:
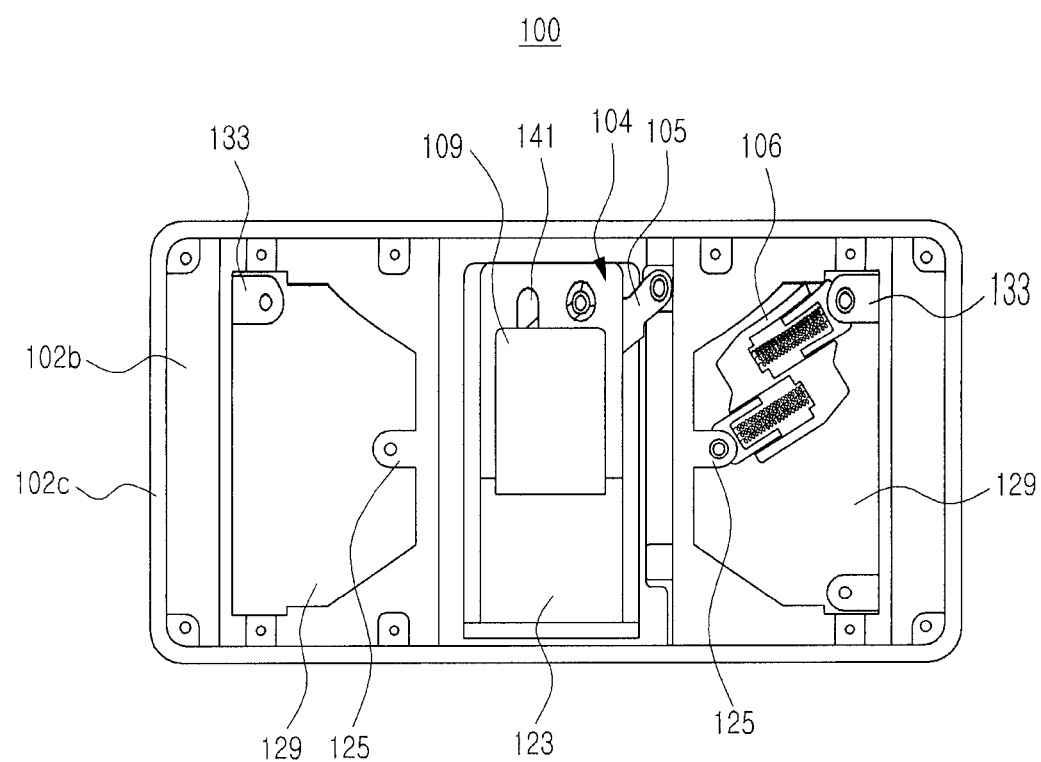
FIGS. 2 and 3 are diagrams showing closing and opening operations of the portable terminal shown in FIG. 1, respectively.
Figure 3:
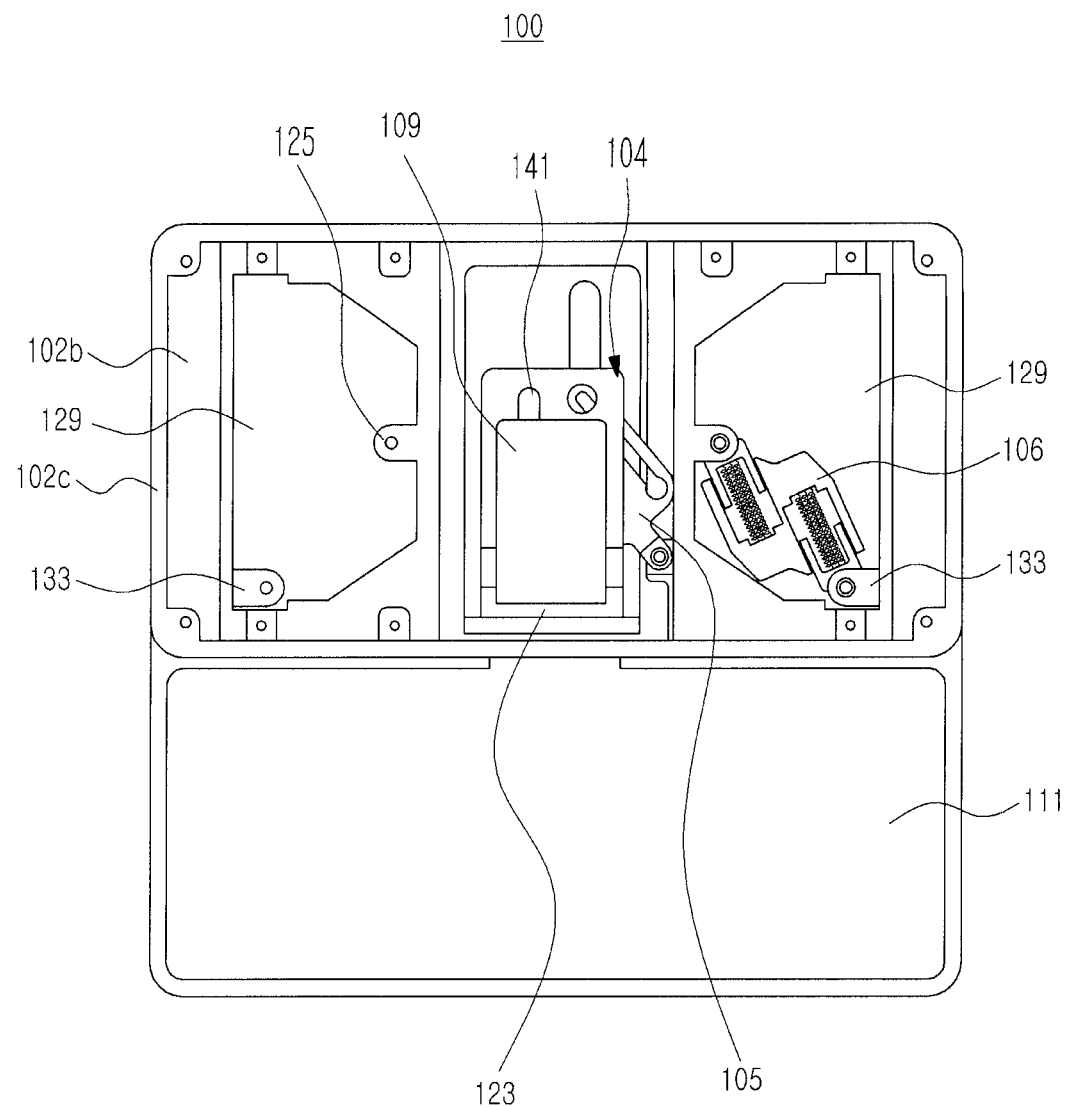
Figure 5:
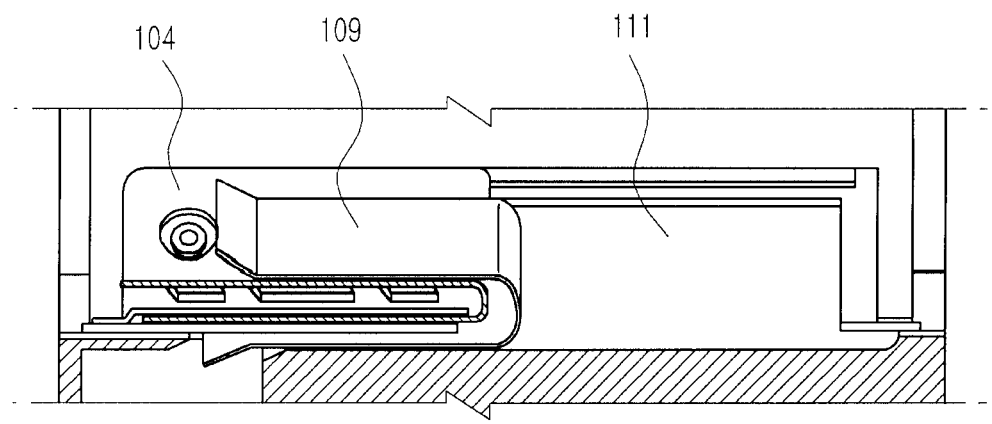
FIG. 5 is a diagram showing a principal portion of the portable terminal shown in FIG. 1.

FIGS. 2 and 3 show an operation of the slide cover 104 during the sliding of the second housing 102. The flexible printed circuit board 109 connecting circuit devices installed on the first and second housings 101 and 102 extends from the first housing 101 via an opening 119 formed in the first closed area 113 of the first housing 101, and led into the second housing 102 via the wiring passageway 123. Referring now to FIG. 5, while passing through the wiring passageway 123, the flexible printed circuit board 109 has a U-shaped form wrapping the slide cover 104. That is, if the slide cover 104 does not exist, the flexible printed circuit board 109 may be wired such that its portions face each other. The reason for wiring the flexible printed circuit board 109 in a U-shaped form in a curved manner is to prevent the flexible printed circuit board 109 from being damaged, or connectors mounted on its both ends from being detached from their counterpart connectors, due to the tensility applied by the sliding of the second housing 102.

As shown in FIG. 2, when the second housing 102 overlaps the first housing 101, the slide cover 104 opens most of the wiring passageway 123, but the wiring passageway 123 is not exposed to the outside because of the overlapping of the housings.

Figure 4:
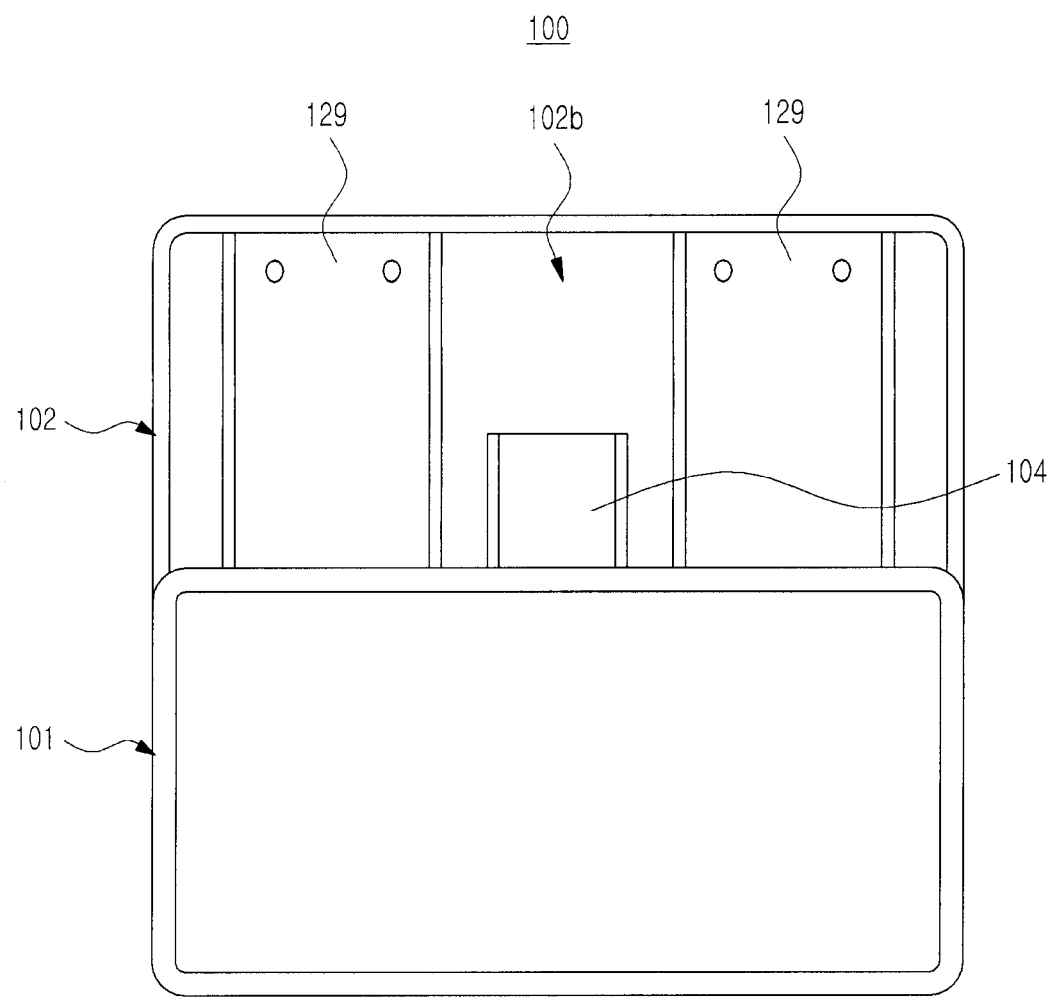
FIG. 4 is a perspective view showing the rear of the portable terminal shown in FIG. 1, in an open state.

As shown in FIG. 3, when the second housing 102 slides opening the first opening/closing area 111 on the first housing 101, the slide cover 104 slides down over the support member 102b, closing part of the wiring passageway 123. In this case, the curved portion of the flexible printed circuit board 109 has moved up compared with when the second housing 102 overlaps the first housing 101. Referring to FIG. 4, when the first opening/closing area 111 is open, part of the wiring passageway 123 is exposed to the outside. This is because the wiring passageway 123 is formed large enough to secure a sufficient space where the flexible printed circuit board 109 may be located even when the first and second housings 101 and 102 overlap each other, as shown in FIG. 2.

If the wiring passageway 123 were exposed to the outside, then the flexible printed circuit board 109 and/or circuit devices in the second housing 102 would also be exposed, thereby spoiling the external appearance of the terminal 100 and causing possible contamination of various electronic parts with foreign substances. However, the slide cover 104 covers up the wiring passageway 123, thus solving these disadvantages. Meanwhile, even when the first opening/closing area 111 is open, part of the wiring passageway 123 formed in the second closed area is not covered up by the slide cover 104, maintaining the space where the flexible printed circuit board 109 may be situated.

If the second housing 102 slides back in a direction of closing the first opening/closing area 111, the link member 105 urges the slide cover 104 to slide with respect to the support member 102b to open the wiring passageway 123, while returning back to its initial position, and the wiring passageway 123 is opened by the slide cover 104, but closed again by the first housing 101.

Figure 7:
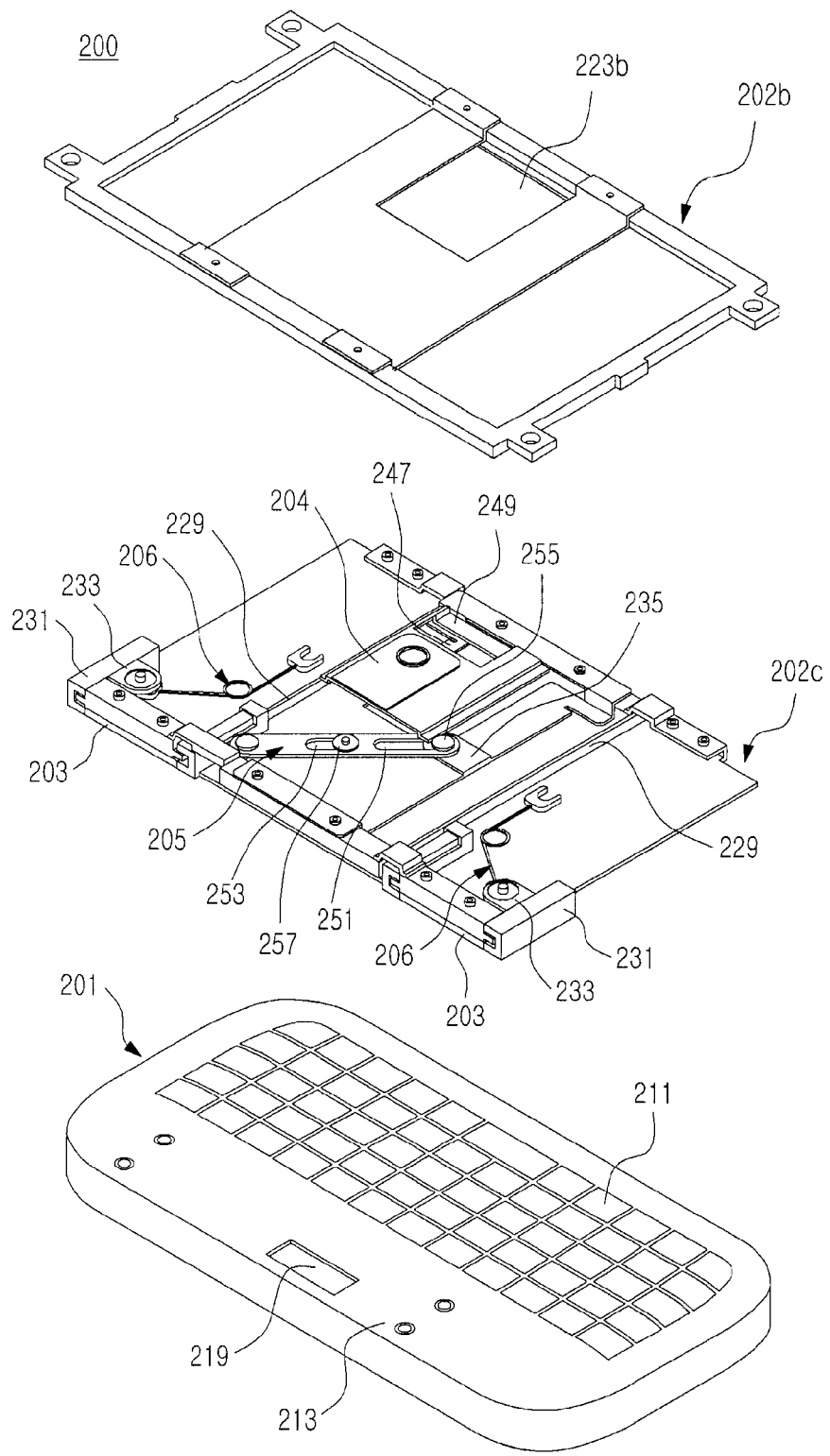
FIG. 7 is an exploded perspective view of a sliding type portable terminal according to a second exemplary embodiment of the present invention.
Figure 8:
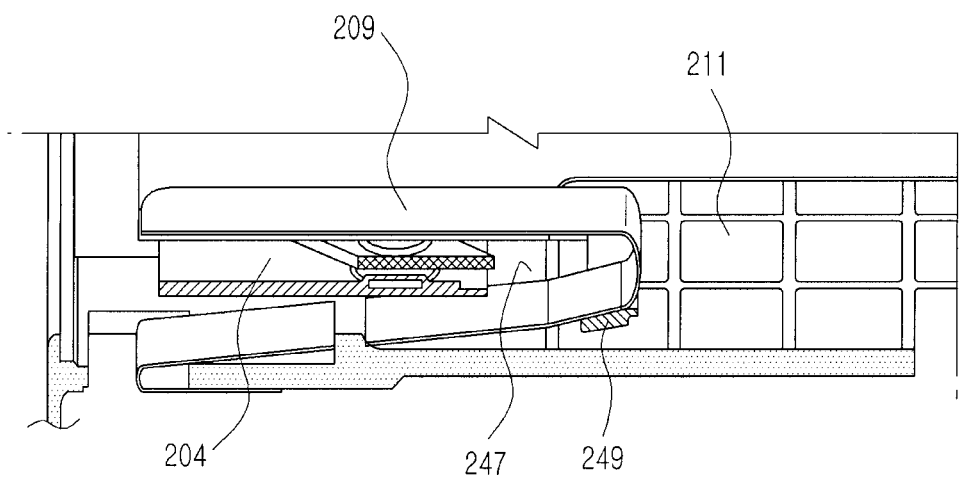
FIG. 8 is a diagram showing a principal portion of the portable terminal shown in FIG. 7.

FIGS. 7 and 8 show a sliding type portable terminal 200 according to a second exemplary embodiment of the present invention. The portable terminal 200 shown in FIG. 7 has a structure in which a slide cover 204 is installed as in the preceding exemplary embodiment. However, this exemplary embodiment is different from the preceding exemplary embodiment in that a wiring hole 247 and a tilting member 249 are provided on the slide cover 204 to prevent a flexible printed circuit board 209 from being interfered with by a first housing 201, particularly by a keypad 211.

As shown in FIG. 7, the first housing 201 of the terminal 200 includes the keypad 211 mounted in a first opening/closing area, and a pair of guide members 203 are mounted in a first closed area 213. An opening 219 is formed between the guide members 203 in the first closed area 213, providing a space through which the flexible printed circuit board 209 extends.

Each of the guide members 203 includes guide ribs 231 mounted on both ends. The guide ribs 231 have guide grooves formed on their respective surfaces that face each other. A first support piece 235 is formed on one of the guide ribs 231, and second support pieces 233 are formed on the respective guide ribs 231 located close to both side ends of the first housing 201. It is to be noted in FIG. 7 that the guide members 203 are engaged with a slide member 202c. A pair of the guide members 203 is engaged close to both side ends of the first housing 201 in the first closed area 213 of the first housing 201.

While it has been shown in the preceding exemplary embodiment that the slide member 102d has a structure in which the moving member 102c and the support member 102b are engaged with each other, it is shown in this exemplary embodiment that a moving member and a support member are manufactured into one body and a separate cover member 202b is mounted between an undepicted second housing and the slide member 202c. The slide member 202c and the cover member 202b are coupled to the rear of the second housing, covering up the rear of the second housing, which are similar in structure to the moving member 102c and the support member 102b in the preceding embodiment and will be described in detail below.

With continued reference to FIG. 7, the slide member 202c has a wiring opening 223a (i.e. passageway) formed in its center, and slits 229 are formed in both sides of the wiring passageway 223a, extending along the sliding direction of the second housing. When the slide member 202c is engaged with the guide members 203, one of the guide ribs 231 of each of the guide members 203 is engaged to wrap an inner wall of the associated slit 229, and the other one of guide ribs 231 is engaged to wrap an adjacent side end of the slide member 202c. Accordingly, the slide member 202c may slide in a direction of the width of the first housing 201 by being guided by the slide members 203.

Like the terminal proposed in the preceding exemplary embodiment, the terminal 200 includes elastic members 206 providing a driving force for urging the second housing to slide. Each of the elastic members 206 provides an elastic force for urging its both ends toward the opposite directions, and has one end supported by the associated second support piece 233 and the other end supported by a projection (not shown) mounted on the slide member 202c.

The slide cover 204, which slides along the sliding direction of the second housing, is mounted over the wiring passageway 223a. The slide cover 204 is preferably flat in shape, and includes a separate wiring hole 247 and a tilting member 249 wrapping part of the wiring hole 247. In addition, the terminal 200 includes a link member 205, one end of which is pivotally engaged with the first support piece 235. The link member 205 has first and second long holes 251 and 253 (i.e. first and second slots) placed on a straight line. The first slot 251 extends along a direction of the length of the link member 205 starting from the position near the other end of the link member 205, and the second slot 253 is provided between the first slot 251 and one end of the link member 205. First and second support projections 255 and 257 are slidably fitted into the first and second slots 251 and 253, respectively. The first support projection 255 is fixed to the slide member 202c, and the second support projection 257 is fixed to the slide cover 204.

If the second housing slides with respect to the first housing 201, the first support projection 255 also slides together with the second housing, rotating the link member 205, and the second support projection 257 slidably fitted into the second slot 253 also slides along with the second housing. However, the second support projection 257 slides within a small range compared with the first support projection 255, causing the slide cover 204 to slide over the slide member 202c in linkage with the second housing. This structure in which the slide cover 204 is linked to the second housing by the link member 205 may be easily understood in connection with the preceding exemplary embodiment.

As the second housing slides, the slide cover 204 opens/closes the wiring passageway 223a. The slide cover 204 slides no matter whether the keypad 211 is open so as to place the wiring hole 247 on the first closed area 213 of the first housing 201, thus always maintaining the covered state. That is, while the second housing slides, the slide cover 204 slides over the slide member 202c, maintaining the state in which the wiring hole 247 is placed in the first closed area 213.

Referring now to FIG. 8, the flexible printed circuit board 209 extends from the first housing 201 via the opening 219 and inside the second housing via the wiring passageway 223a, especially the wiring hole 247 formed in the slide cover 204. The flexible printed circuit board 209 is led inside the second housing by being supported by the tilting member 249, so it is led into the wiring hole 247 between the first and second housings, tiltingly extending from the opening 219 formed in the first housing 201 toward a direction far away from the keypad 211.

The flexible printed circuit board 209 led inside the second housing is wired in a U-shaped form in a curved manner in the second housing, so that its portions may face each other. As a result, even though the second housing slides, the curved portion of the flexible printed circuit board 209 is placed inside the second housing, maintaining the tilted state between the first and second housings and thus preventing the flexible printed circuit board 209 from being interfered with by other elements, particularly by the keypad 211.

The cover member 202b covers up the rear of the second housing to prevent the elements installed on the slide member 202c, such as the link member 205 and the elastic members 206, from directly facing the circuit devices in the second housing. However, the cover member 202b includes a dummy hole 223b facing the wiring passageway 223a, thereby providing a path via which the flexible printed circuit board 209 can be led inside the second housing.

Figure 9:
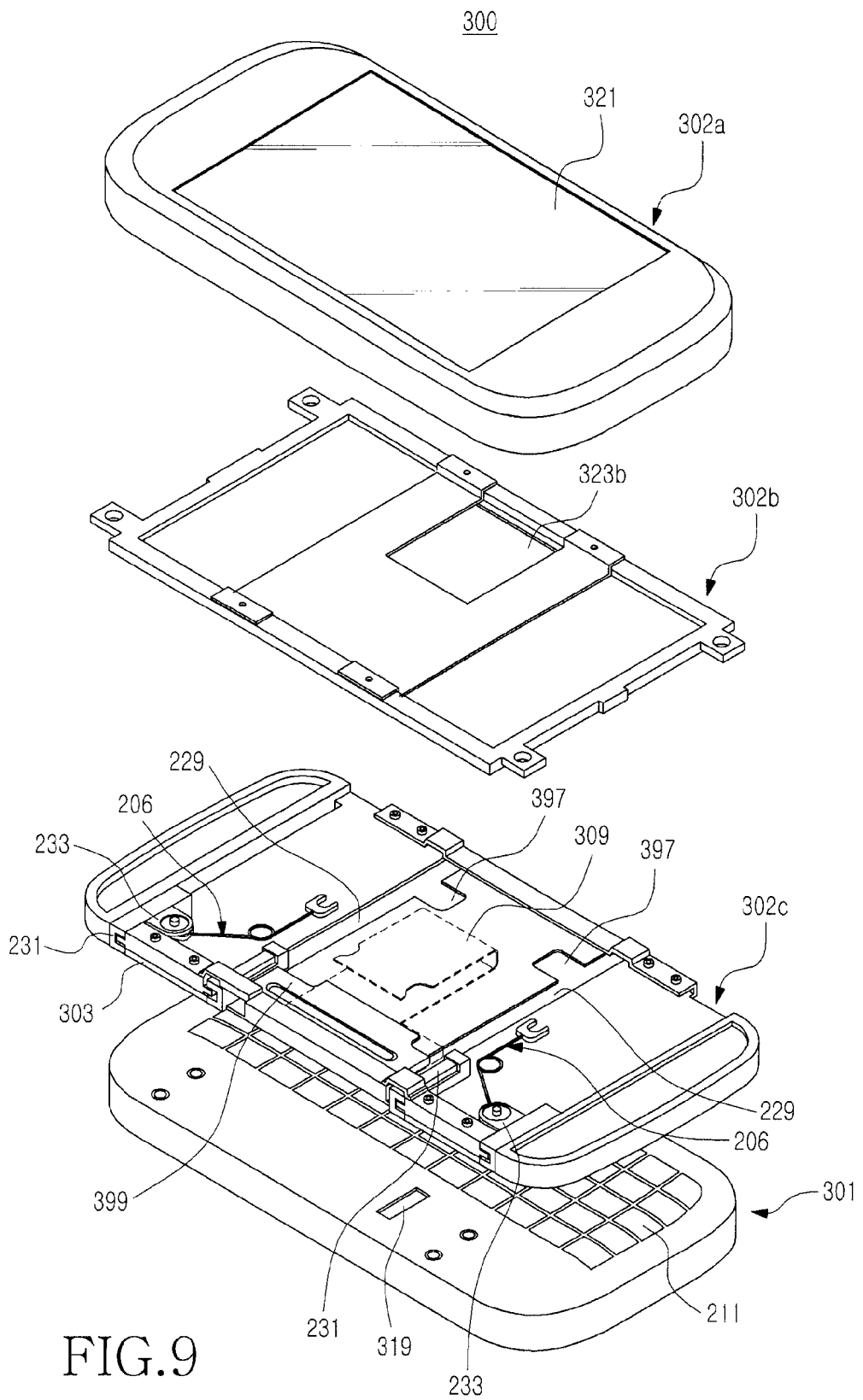
FIG. 9 is an exploded perspective view of a sliding type portable terminal according to a third exemplary embodiment of the present invention.
Figure 10:
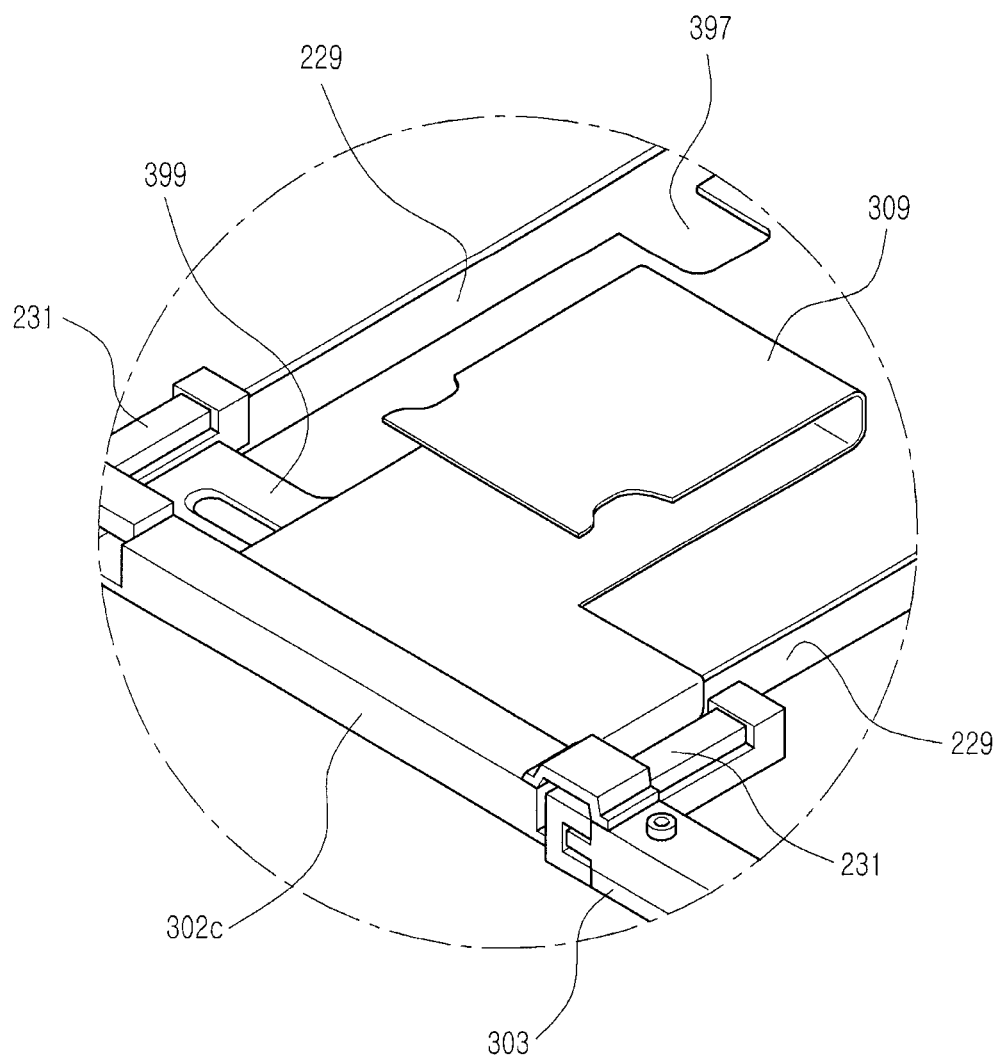
FIG. 10 is a diagram showing a principal portion of the portable terminal shown in FIG. 9.
Figure 11:
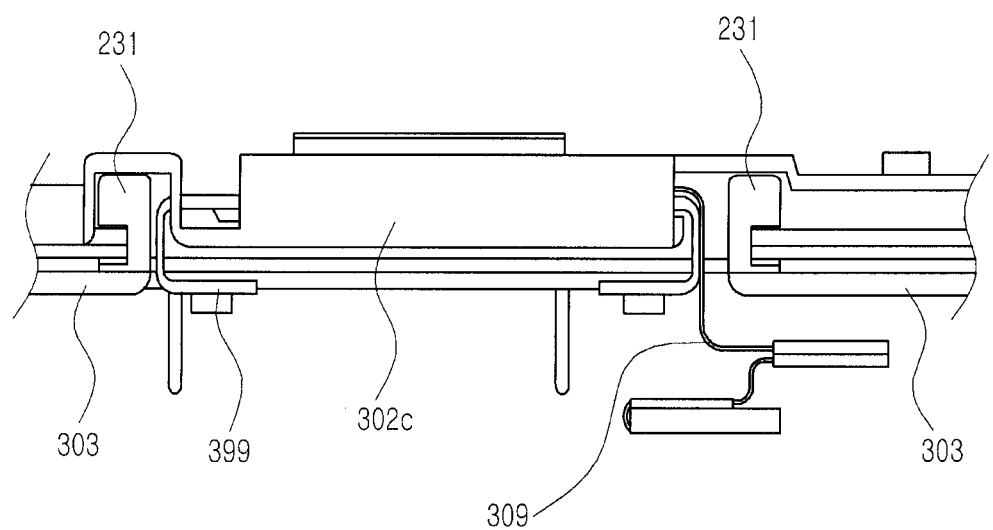
FIG. 11 is a side view showing the principal portion of the portable terminal shown in FIG. 10.

FIGS. 9 to 11 show a sliding type portable terminal 300 according to a third exemplary embodiment of the present invention. The portable terminal 300 is similar in structure to the portable terminal 200 described in the second embodiment except for the wiring structure of a flexible printed circuit board 309. Therefore, in the drawings, the same reference numerals or no reference numerals are given to the elements which can be easily understood with reference to the preceding embodiment, and a detailed description thereof may be omitted.

An opening 319 for leading-out of a flexible printed circuit board 309 is formed in a first housing 301 of the terminal 300, facing one of slits 229 formed in a slide member 302c, and has a shape of a slot extending along the direction in which the associated slit 229 extends. Assembly holes 397 connected to the slits 229 are formed in the slide member 302c. The slits 229 and the assembly holes 397 are connected to each other, forming a shape similar to the alphabet P.

A dummy plate 399 is attached to the slide member 302c between the slits 229. In the course of wiring the flexible printed circuit board 309, the flexible printed circuit board 309 may be attached to the dummy plate 399 to prevent floating of the board. However, if the flexible printed circuit board 309 is directly attached to an inner side of the slide member 302c, it is not necessary to install the dummy plate 399. The dummy plate 399 is fixed near the edge of the slide member 302c at one side ends of the slits 229.

Both ends of the dummy plate 399 are bent to wrap the outer surface of the slide member 302c, passing by the slits 229. In order to facilitate easy assembly according to such shape of the dummy plate 399, the assembly holes 397 are connected to the slits 229 during their production. That is, both ends of the dummy plate 399 are placed on the outer surfaces of the slide member 302c through the assembly holes 397 and moved up to one side ends of the slits 229 along the slits 229, and then the dummy plate 399 is fixed to the slide member 302c.

A cover member 302b with a wiring opening 323b (i.e. passageway) formed therein is mounted between the slide member 302c and a housing member 302a of a second housing. That is, the slide member 302c and the cover member 302b are engaged with the housing member 302a, completing the second housing.

In the meantime, the flexible printed circuit board 309 connecting circuit devices embedded in the first and second housings extends from the opening 319 of the first housing 301, extends inside the slide member 302c via the slits 229, and then attached to the dummy plate 399. In addition, the flexible printed circuit board 309 extends along the sliding direction of the second housing starting from the portion where the dummy plate 399 is attached, and then is completely led into the inside of the second housing via the wiring passageway 323b. The flexible printed circuit board 309 is curved in a U-shape form in the second housing, such that its portions face each other. While it is shown in FIG. 9 or 10 that the flexible printed circuit board 309 is already curved in a U-shaped form on the slide member 302c, it is to be noted that one of its facing portions is located on an inner surface of the cover member 302b.

Unlike in the preceding embodiment, since the flexible printed circuit board 309 is wired via the slits 229 already formed in the slide member 302c, it is not necessary to install a separate slide cover, reducing the structure of the terminal 300. In addition, part of the flexible printed circuit board 309 wired between the first and second housings is fixed in a first closed area of the first housing 301, mitigating possible damage due to the sliding of the second housing.

Figure 12:
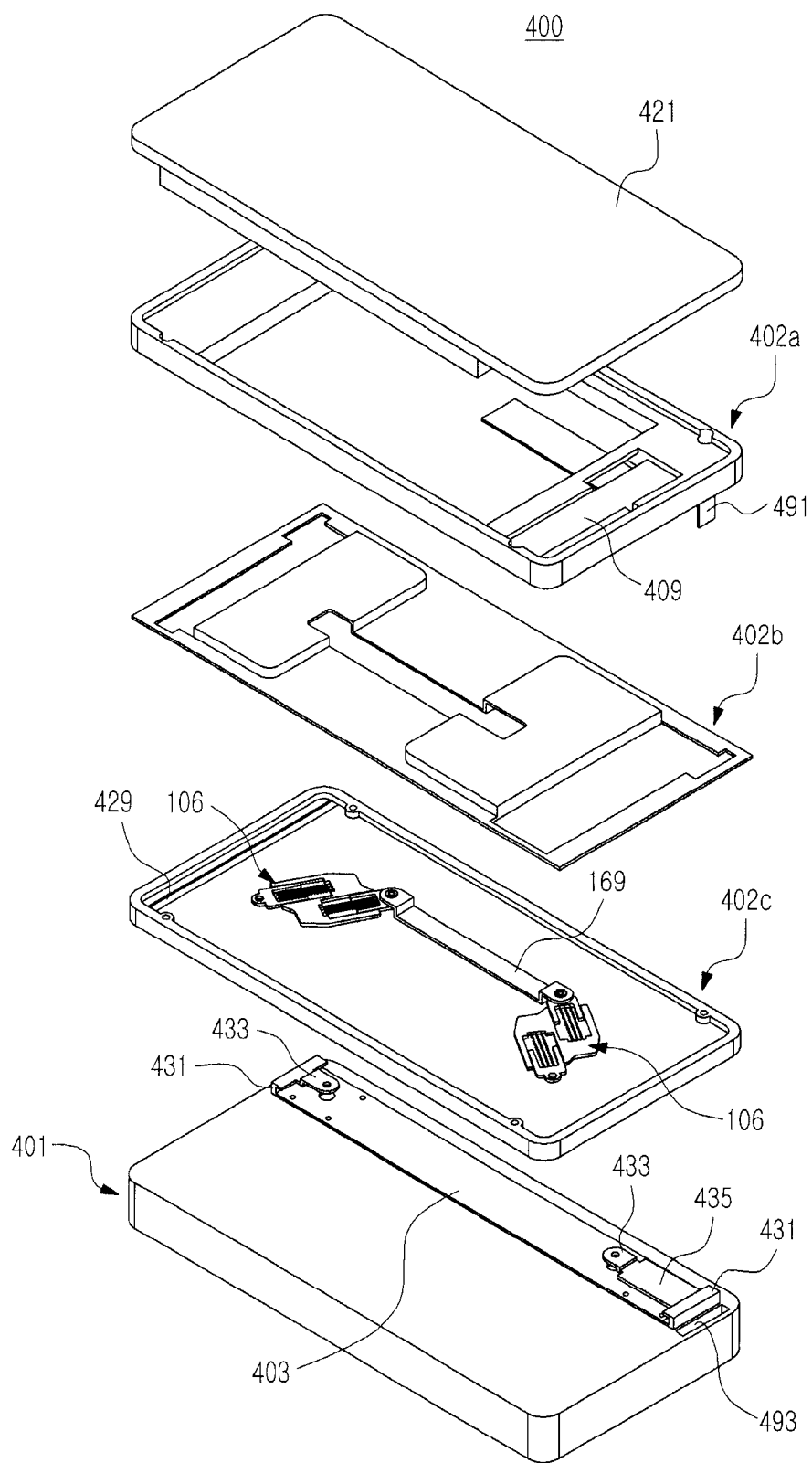
FIG. 12 is an exploded perspective view of a sliding type portable terminal according to a fourth exemplary embodiment of the present invention.
Figure 13:
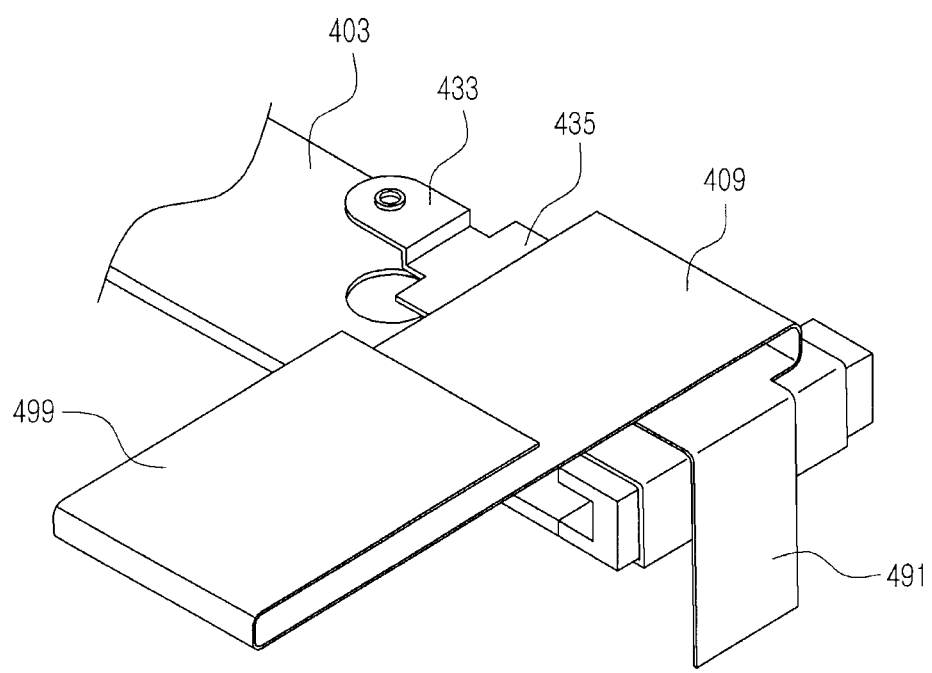
FIG. 13 is a perspective view showing a principal portion of the portable terminal shown in FIG. 12.
Figure 14:
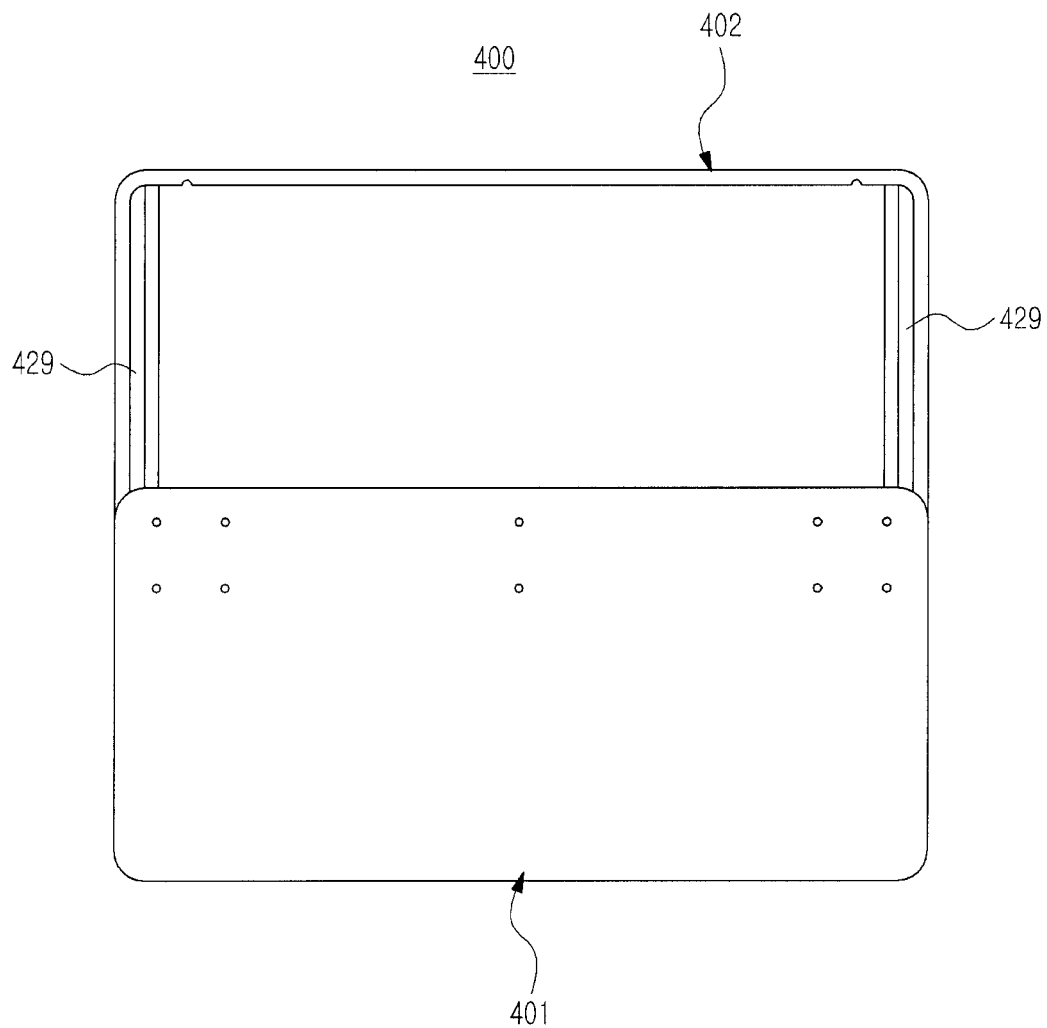
FIG. 14 is a perspective view showing the rear of the portable terminal shown in FIG. 12, in an open state.

FIGS. 12 to 14 show a sliding portable terminal 400 according to a fourth exemplary embodiment of the present invention.

While the portable terminal 300 according to the third exemplary embodiment of the present invention has a structure in which the flexible printed circuit board 309 is wired via the slits 229 formed in the slide member 302c between the guide members 303, the terminal 400 according to this exemplary embodiment has a structure in which slits 429 formed in a slide member are placed adjacent to both ends of the terminal 400, and a flexible printed circuit board 409 passes by one side of a guide member 403 and its one portion is fixed to the guide member 403.

The portable terminal 400 according to the fourth exemplary embodiment includes the guide member 403 mounted on one surface of a first housing 401, and the slide member mounted on one surface of a second housing. The slide member includes a moving member 402c and a support member 402b. As the slide member is slidably engaged by being guided by the guide member 403, the second housing slides over one surface of the first housing 401.

An undepicted keypad is mounted on the first housing 401 and opened/closed by the sliding of the second housing, and a display device 421 is mounted on a housing member 402a of the second housing. The slide member is coupled to the rear of the housing member 402a, completing the second housing.

The guide member 403 includes guide ribs 431 provided on its both ends. Upper portions of the guide ribs 431 are located inside the moving member 402c by way of the slits 429 formed in the moving member 402c, and support pieces 433 are formed on the respective guide ribs 431. One of the support pieces 433 may be provided on an end of a fixing piece 435 extending from its associated guide rib 431. As will be described below, the fixing piece 435 is used to secure part of the flexible printed circuit board 409.

The guide member 403 is installed in a closed area of the first housing 401, i.e., in an area that is always covered up regardless of the sliding of the second housing, and an opening 493 is formed adjacent to one side of the guide member 403 in the closed area. The opening 493 is situated between the guide rib 431 with the fixing piece 435 and one side end of the first housing 401.

The slide member serving as a rear cover of the housing member 402a slidably connects the second housing to the first housing 401. The moving member 402c, part of the slide member, is slidably engaged directly with the guide member 403, and the support member 402b is mounted between the moving member 402c and the housing member 402a, covering up the slits 429 at the inside of the moving member 402c. When an elastic member 106 is installed, the support member 402b prevents the elastic member 106 from directly facing circuit devices in the second housing.

The slits 429 are situated adjacent to both side ends of the moving member 402c, and the guide ribs 431 of the guide member 403 have their ends located inside the moving member 402c by way of their associated slits 429. The guide ribs 431 have guide grooves formed on their facing surfaces to wrap inner walls of the associated slits 429. As a result, the support pieces 433 and the fixing piece 435 are situated inside the moving member 402c.

As for the elastic member 106 providing a driving force for sliding the second housing between the first and second housings, one end of the elastic member 106 is supported by one of the support pieces 433 and the other end is supported on the slide member. In this embodiment, a driving piece 169 is installed between the moving member 402c and the support member 402b to support the other end of the elastic member 106. However, it would be understood by those skilled in the art that as described in the preceding embodiments, a structure supporting the other end of the elastic member 106 may be constructed by forming a projection on the moving member 402c or the support member 402b.

The flexible printed circuit board 409 connecting circuit devices in the first and second housings is wired through the slits 429. One end 491 of the flexible printed circuit board 409 is wired via the opening 493 formed in the first housing 401, and the flexible printed circuit board 409 extends from the first housing 401 and extends passing through the slits 429. In passing through the slits 429, part of the flexible printed circuit board 409 is attached and fixed to the guide rib 431 and the fixing piece 435, and wired in a U-shaped form in a covered manner in the second housing.

The flexible printed circuit board 409 maintains the fixed state in the space between the first and second housings, and is wired in a safe space without being interfered with by the elastic member 106 even in the second housing. Besides, the flexible printed circuit board 409 is located in the always-covered area in the space between the first and second housings, so it is not exposed to the outside, maintaining the elegant appearance of the terminal.

Figure 15:
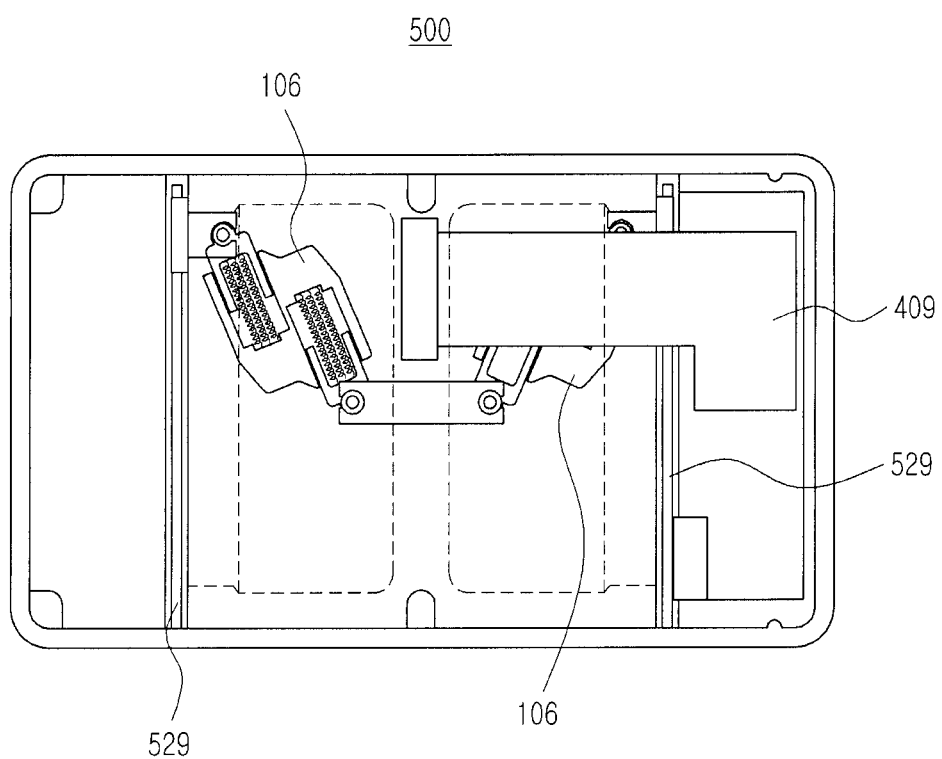
FIGS. 15 and 16 are diagrams showing closing and opening operations of a sliding type portable terminal according to a fifth embodiment of the present invention, respectively.
Figure 16:
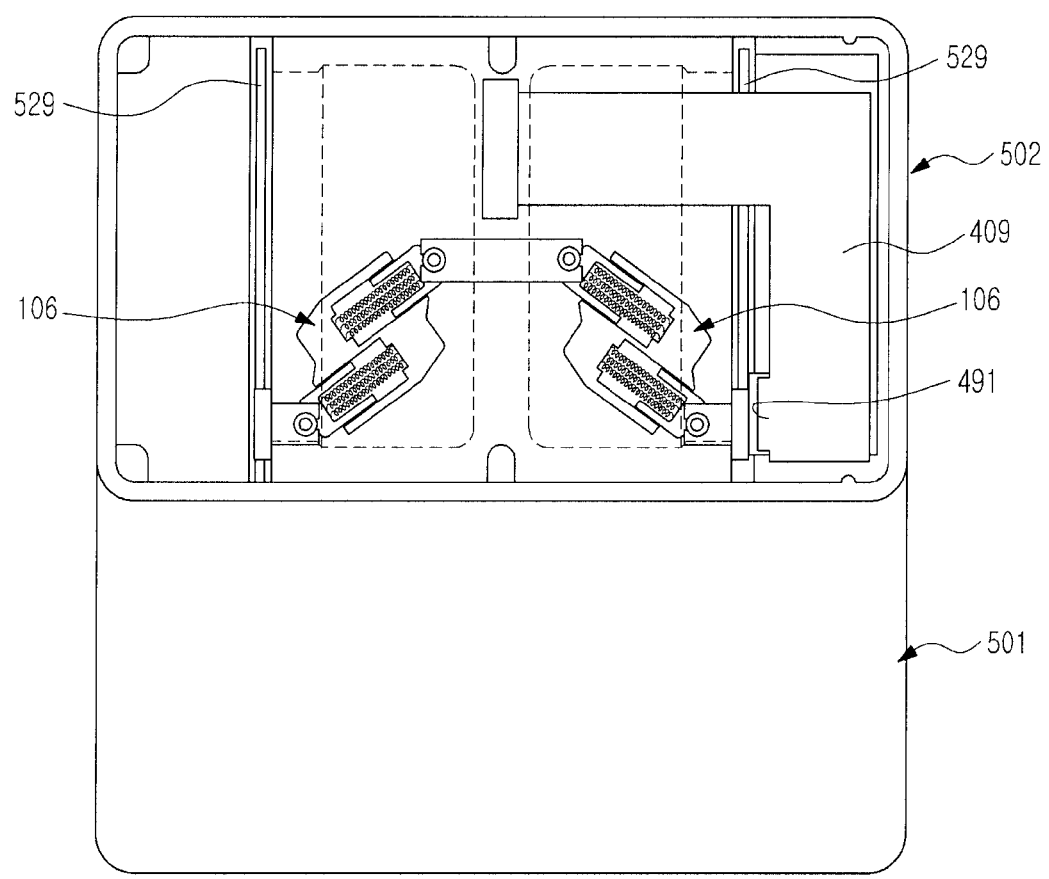
Figure 17:
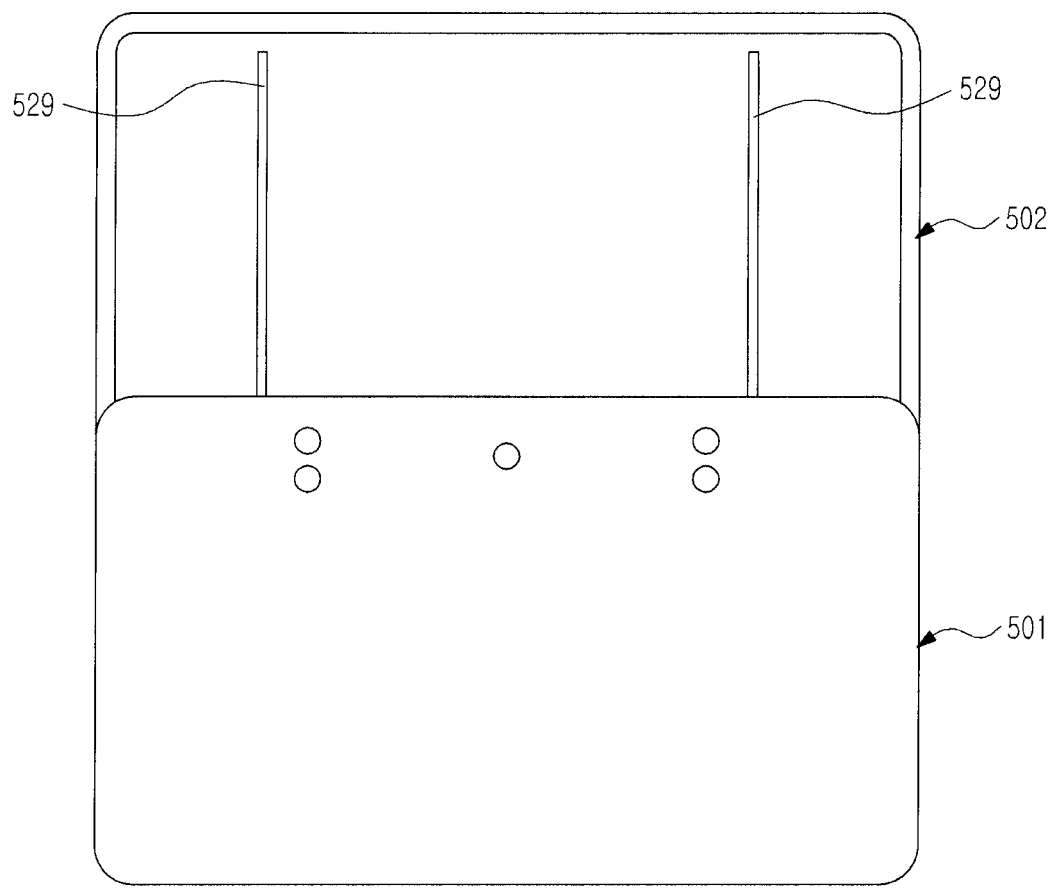
FIG. 17 is a perspective view showing the rear of the portable terminal shown in FIG. 16, in an open state.

FIGS. 15 to 17 show a sliding type portable terminal 500 according to a fifth exemplary embodiment of the present invention. The terminal 500 is similar in structure to the terminal 400 described in the fourth exemplary embodiment, but different in that positions of slits are spaced apart from both side ends of a second housing by a specific distance and a flexible printed circuit board is wired between a slit in one side and a side end of the second housing. However, it should be noted in FIGS. 15 and 16 that part of the second housing is cut out simply to show the wiring structure of the flexible printed circuit board.

Therefore, in the following description, the same reference numerals or no reference numerals are given to the elements which could be easily understood with reference to the fourth exemplary embodiment and other similar embodiments, and a detailed description thereof can be omitted if needed.

As mentioned previously, in the case of the terminal 500, slits 529 of a slide member are formed to be spaced apart by a specific distance from both side ends of a second housing 502. In the space between first and second housings 501 and 502, a flexible printed circuit board 409 is located in a closed area that is always covered up regardless of the sliding of the second housing 502, and is led into the inside of the second housing 502 by way of at least one of the slits 529.

Being led into the second housing 502 via the slit 529, the flexible printed circuit board 409 is attached to the inside of the second housing 502, especially to an inner side of the slide member, by being bent such that it may extend between the slit 529 and a side end of the second housing 502. In the inside of the second housing 502, the flexible printed circuit board 409 is bent in a U-shaped form, extending along the sliding direction of the second housing 502, so its portions may face each other.

The slide member may also include a moving member and a support member like the slide member of the fourth exemplary embodiment, and elastic members 106 may be installed between the moving member and the support member. The flexible printed circuit board 409 is located in the inside of the second housing 502 compared with the support member, thereby avoiding interference by the elastic members 106 installed between the moving member and the support member.

As is apparent from the foregoing description, the proposed sliding type portable terminal may cover up the flexible printed circuit board and/or its wiring structure using the slide cover, preventing its external appearance from being spoiled. The flexible printed circuit board is inevitably wired in a curved manner in the terminal to secure the length required for the sliding operation, and the curved portion of the flexible printed circuit board may be disposed in the housing of the terminal, mitigating the possible damage of the flexible printed circuit board due to the sliding opening/closing operations.

Even though no slide cover is installed, if the flexible printed circuit board is wired by way of the slit formed in the sliding coupling structure between housings, it is not necessary to form a separate wiring passageway, which improves the external appearance and structural stability of the terminal. Also, even though the flexible printed circuit board is wired through the slit, the curved portion of the flexible printed circuit board needed to secure the length required for the sliding operation can be disposed in the inside of any one of the housings of the terminal, mitigating the possible damage of the flexible printed circuit board.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, since the guide ribs wrapping both ends of the slide member or the moving member, or inner walls of slits formed therein are directly rubbed by the sliding of the second housing, they may be made of synthetic resins having abrasion resistance and lubricity, such as polyoxymethylene (POM), to mitigate generation of noises. Even though the guide ribs are not made of synthetic resins, the noise generation may be suppressed by coating with synthetic resins the portions that are subjected to direct rubbing by the sliding of the second housing.

In addition, while it has been described in the exemplary embodiments of the present invention that the second housing linearly moves on the first housing, if facing surfaces of the first and second housings are formed in a curved shape, the sliding of the second housing will be made along the curved surface. Even though the facing surfaces of the first and second housings are formed flat, if the guide ribs or the slits actually guiding the sliding of the second housing have a shape of a curved trajectory, the second housing may slide along the curved trajectory. That is, while it has been described in the exemplary embodiments that only the sliding type portable terminal is considered, the second housing of which moves linearly, the sliding trajectory of the second housing with respect to the first housing is subject to various changes.

What is claimed is:

1. A sliding type portable terminal including a first housing and a second housing slidably engaged face-to-face with the first housing, said portable terminal comprising: attached on a top surface of the first housing, two rectangular-shaped guide members having a first pair of guide ribs and second pair of guide ribs positioned on both sides of the surface of the first housing to guide the sliding of the two respective flat boards attached to a bottom of the first housing, the guide member mounted in a first closed area provided on one surface of the first housing so that said guide member always remains covered by the second housing; a non-elastic link member with a first end rotatably coupled to at least one of the guide ribs and a second end coupled to a support member of the second housing; an elastic member with a first end coupled to the guide rib and a second end coupled to the support member of the second housing; a slide member mounted on one surface of the second housing and guided to slide over the first housing by the guide member; a wiring passageway formed in the slide member; and a slide cover slidably mounted on the slide member to open/close the wiring passageway, wherein on the slide member, one portion of the wiring passageway is formed in a second closed area always covered by the first housing, and the remaining portion of the wiring passageway is formed in an opening/closing area that is opened/closed by the first housing according to a sliding position of the second housing, and wherein each guide ribs of each of the pairs of guide ribs oppositely face each other and wherein one of the first pair of guide ribs is slidably engaged with a first inner edge of the slide member and wherein one of the second pair of guide ribs is slidably engaged with a second inner edge of the slide member, and wherein when the opening/closing area is opened, the slide cover closes at least the remaining portion of the wiring passageway, which is formed in the opening/closing area.

2. The sliding type portable terminal of claim 1, wherein the slide member comprises slits formed in both sides of the wiring passageway and extending along a moving direction of the second housing, and the guide member comprises guide ribs provided on both side ends of the slide member and engaged with an inner wall of one of the slits, wrapping a side end of the slide member.

3. The sliding type portable terminal of claim 2, further comprising:
   a link member with a first end rotatably coupled to at least one of the guide ribs;
   a first slot formed in a second end of the link member and extending along a length direction of the link member; and
   a first support projection fixed to the slide member and slidably fitted into the first slot,
   wherein as the second housing slides, the first support projection slides with respect to the first housing together with the second housing, rotating the link member.

4. The sliding type portable terminal of claim 3, further comprising:
   a second slot extending on the link member in parallel with the first slot; and
   a second support projection fixed to the slide cover and slidably fitted into the second slot,
   wherein as the link member rotates by the sliding of the second housing, the second support projection slides within the second slot and slides the slide cover with respect to the slide member.

5. The sliding type portable terminal of claim 4, wherein the second support projection is placed closer to the first end of the link member than to the first support projection.

6. The sliding type portable terminal of claim 3, further comprising a first support piece extending from any one of the guide ribs, wherein the first end of the link member is rotatably coupled to the first support piece.

7. The sliding type portable terminal of claim 2, further comprising:
   a second support piece formed on each of the guide members; and
   an elastic member with one end supported by the first support piece and another end supported by the slide member to provide an elastic force for urging its both ends toward the opposite directions;
   wherein a point where both ends of the elastic member are closest to each other is situated within a range in which the second housing slides.

8. The sliding type portable terminal of claim 1, wherein the slide cover comprises:
   a wiring hole situated in the wiring passageway; and
   a tilting member placed on one side of the wiring hole and situated in the wiring passageway.

9. The sliding type portable terminal of claim 8, further comprising a flexible printed circuit board extending from the first housing and into the second housing via the wiring passageway, wherein the flexible printed circuit board extends along a moving direction of the second housing passing through the wiring hole in the second housing and is arranged in a U-shaped form in a curved manner such that at least one portion of the flexible printed circuit board overlaps to face itself in the U-shaped form.

10. The sliding type portable terminal of claim 9, wherein the flexible printed circuit board is arranged in a tilted position between the first housing and the second housing by being supported by the tilting member, so that the flexible printed circuit board extends into the second housing through the wiring hole.

11. The sliding type portable terminal of claim 8, wherein when the opening/closing area is opened, the slide cover slides over the slide member to position the wiring hole within the second closed area.

12. The sliding type portable terminal of claim 1, further comprising a cover member arranged between the second housing and the slide member.

13. The sliding type portable terminal of claim 12, wherein the cover member comprises a dummy hole facing the wiring passageway.

14. A sliding type portable terminal including a first housing and a second housing slidably engaged face-to-face with the first housing, said portable terminal comprising: attached on a to surface first housing, two rectangular-shaped guide members having a first pair of guide ribs and a second pair of guide ribs positioned on both sides of the surface of the first housing to guide the sliding of the two respective flat boards attached to a bottom of the first housing, the guide member mounted in a first closed area provided on one surface of the first housing so that said guide member always remains covered by the second housing; a non-elastic link member with a first end rotatably coupled to at least one of the guide ribs and a second end coupled to a support member of the second housing; an elastic member with a first end coupled to the guide rib and a second end coupled to the support member of the second housing; a slide member mounted on one surface of the second housing and guided to slide over the first housing by the guide member; wherein guide ribs of each of the pairs of guide ribs oppositely face each other and wherein one of the first pair of guide ribs is slidably engaged with a first inner edge of the slide member and wherein one of the second pair of guide ribs is slidably engaged with second inner edge of the slide member; a pair of slits formed in the slide member and extending along a moving direction of the second housing in parallel with each other; and a flexible printed circuit board that extends from the first housing into the second housing via one of the slits, wherein the guide member is engaged to wrap an inner wall of at least one of the slits, and wherein in the second housing, the flexible printed circuit board extends along the moving direction of the second housing and is arranged in a U-shaped form in a curved manner so that at least one portion of the flexible printed circuit board overlaps to face itself in the U-shaped form.

15. The sliding type portable terminal of claim 14, wherein the guide member comprises guide ribs provided on both side ends of the slide member and engaged with an inner wall of one of the slits to wrap any one side end of the slide member.

16. The sliding type portable terminal 15, further comprising a dummy plate provided between the slits, wherein at least one portion of the flexible printed circuit board is attached to the dummy plate.

17. The sliding type portable terminal of claim 14, wherein the guide member comprises guide ribs provided on both ends thereof, the guide ribs each have a guide groove formed on their facing surfaces, and the guide ribs are situated in their associated slits and engaged such that the guide grooves wrap inner walls of the slits.

18. The sliding type portable terminal of claim 17, wherein the slits are formed close to both side ends of the slide member, and the flexible printed circuit board extends into the second housing, passing through the slits in the way of wrapping the guide ribs.

19. The sliding type portable terminal of claim 18, further comprising a support piece extending from the associated guide rib, wherein part of the flexible printed circuit board is attached to the support piece.

20. The sliding type portable terminal of claim 19, further comprising an elastic member with one end supported by the support piece and the other end supported on the slide member to provide an elastic force for urging its both ends toward the opposite directions, wherein a point where both ends of the elastic member are closest to each other is situated in which a range where the second housing slides.

21. The sliding type portable terminal of claim 17, wherein the slits are formed in positions spaced apart from both side ends of the slide member, and the flexible printed circuit board extends into the second housing, passing through the slit in the way of wrapping the other inner wall of the slit facing an inner wall wrapped by the guide rib.

22. The sliding type portable terminal of claim 21, wherein a curved portion of the flexible printed circuit board is positioned between the slit in one side and one side end of the slide member in the second housing.

* * * * *

UNITED STATES PATENT AND TRADEMARK OFFICE
CERTIFICATE OF CORRECTION

PATENT NO.        : 8,738,102 B2
APPLICATION NO.   : 12/898799
DATED             : May 27, 2014
INVENTOR(S)       : Ahn et al.

It is certified that error appears in the above-identified patent and that said Letters Patent is hereby corrected as shown below:

In the Claims

Column 13, Claim 1, Line 42 should read as follows:
--...ribs and a second...--

Column 15, Claim 14, Line 20 should read as follows:
--...on a top surface...--

Column 16, Claim 16, Line 9 should read as follows:
--...terminal of claim 15...--

Signed and Sealed this
Twenty-ninth Day of July, 2014

Michelle K. Lee
*Deputy Director of the United States Patent and Trademark Office*